(12) United States Patent
Durocher et al.

(10) Patent No.: US 8,453,464 B2
(45) Date of Patent: Jun. 4, 2013

(54) AIR METERING DEVICE FOR GAS TURBINE ENGINE

(75) Inventors: Eric Durocher, Vercheres (CA); Pierre-Yves Legare, Chambly (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 916 days.

(21) Appl. No.: 12/571,987

(22) Filed: Oct. 1, 2009

(65) Prior Publication Data

US 2011/0079020 A1 Apr. 7, 2011

(51) Int. Cl.
F02C 7/20 (2006.01)

(52) U.S. Cl.
USPC ............................................ 60/799; 415/137

(58) Field of Classification Search
USPC ............. 60/796–800, 805–806; 415/136–137
See application file for complete search history.

(56) References Cited

U.S. PATENT DOCUMENTS

| 3,829,233 | A | | 8/1974 | Scalzo et al. |
| 3,941,500 | A | | 3/1976 | Glenn |
| 4,247,248 | A | | 1/1981 | Chaplin et al. |
| 4,379,560 | A | * | 4/1983 | Bakken .......................... 277/628 |
| 4,863,345 | A | | 9/1989 | Thompson et al. |
| 5,295,787 | A | | 3/1994 | Leonard et al. |
| 5,755,445 | A | * | 5/1998 | Arora ............................ 277/418 |
| 6,418,727 | B1 | * | 7/2002 | Rice et al. ....................... 60/799 |
| 6,877,952 | B2 | | 4/2005 | Wilson |
| 6,895,757 | B2 | * | 5/2005 | Mitchell et al. ................. 60/772 |
| 7,210,899 | B2 | | 5/2007 | Wilson, Jr |
| 7,494,317 | B2 | | 2/2009 | Keller et al. |

* cited by examiner

Primary Examiner — Phutthiwat Wongwian
(74) Attorney, Agent, or Firm — Norton Rose Canada LLP

(57) ABSTRACT

An air metering apparatus for a secondary air system of gas turbine engine includes a metering gap defined between surfaces comprised of one or more metals having one of similar coefficients of thermal expansion or similar thermal expansions at an operating temperature. Provided is an air metering gap which undergoes thermal growth in a way which provides a suitable air metering gap during engine running conditions.

13 Claims, 3 Drawing Sheets

AIR METERING DEVICE FOR GAS TURBINE ENGINE

TECHNICAL FIELD

The described subject matter relates generally to gas turbine engines and, more particularly, to an improved air metering for a gas turbine engine.

BACKGROUND OF THE ART

Gas turbine engines have secondary air systems which provide cooling to various engine parts. It is desirable to minimize cooling air requirements to improve engine efficiency, and hence secondary air is typically metered, such as through metering holes in an engine casing or similar structure. A simpler arrangement is sometime to meter air through gaps between adjacent parts in the secondary air system. However, since components tend to be made from differing materials, depending on their particular design requirements, this results in differing thermal growths, which may be significant depending on the materials, location in the engine, etc. The differing thermal expansion/contraction characteristics of various engine components can negatively affect the ability to meter air accurately, however, and hence the designer must optimize the gap size to, for example, provide a desired flow for a threshold or target operating segment of the aircraft cycle (e.g. cruise, take-off, etc.), and sub-optimal performance for other segments. Accordingly, there is a need to provide an improved air metering arrangement for gas turbine engines.

SUMMARY OF THE INVENTION

According to one aspect, the described subject matter provides a gas turbine engine having an axis of rotation, the engine comprising a radially-extending annular wall comprised of a metal having a first thermal expansion at an engine running temperature; a cylindrical surface extending axially past the wall, the surface and wall cooperating to define adjacent secondary airflow cavities, one secondary airflow cavity on either side of the wall, the airflow cavities in serial communication with a source of pressurized secondary air, the cylindrical surface comprised of a metal having a second thermal expansion at an engine running temperature, the second thermal expansion unequal to the first coefficient; and an annular ring radially-slidably mounted to the radial wall, the ring cooperating with the cylindrical surface to define a non-zero gap between them, the gap providing a minimum opening between the cavities and hence in use metering serial secondary airflow communication between the cavities, the ring having a face which in use sealingly cooperates with the wall to impede secondary airflow between the ring and wall, the ring comprised of a metal having a thermal expansion at an engine running temperature substantially equal to the second thermal expansion.

According to another aspect, the described subject matter provides a gas turbine engine having an axis of rotation, the engine comprising a radially-extending annular wall having a terminal periphery, the radial wall comprised of a metal having a first coefficient of thermal expansion; a cylindrical surface extending axially past the terminal periphery of the wall, cylindrical surface comprised of a metal having a second coefficient of thermal expansion which is unequal to the first coefficient; and an annular ring extending around and radially-slidably mounted to the radial wall, the ring having a face sealingly cooperating with the wall to impede airflow therebetween when the engine is in use, the ring having a terminal periphery extending radially closer to the cylindrical surface than the terminal periphery of the wall, the terminal periphery of the ring spaced from the cylindrical surface to provide a non-zero gap between the ring and the cylindrical wall selected to meter a secondary airflow of the engine in communication with the gap, the ring comprised of a metal having a coefficient of thermal expansion substantially equal to the second coefficient of thermal expansion.

Further details of these and other aspects will be apparent from the detailed description and drawings included below.

DESCRIPTION OF THE DRAWINGS

Reference is now made to the accompanying drawings depicting aspects of the described subject matter, in which.

DETAILED DESCRIPTION

Figure 1:
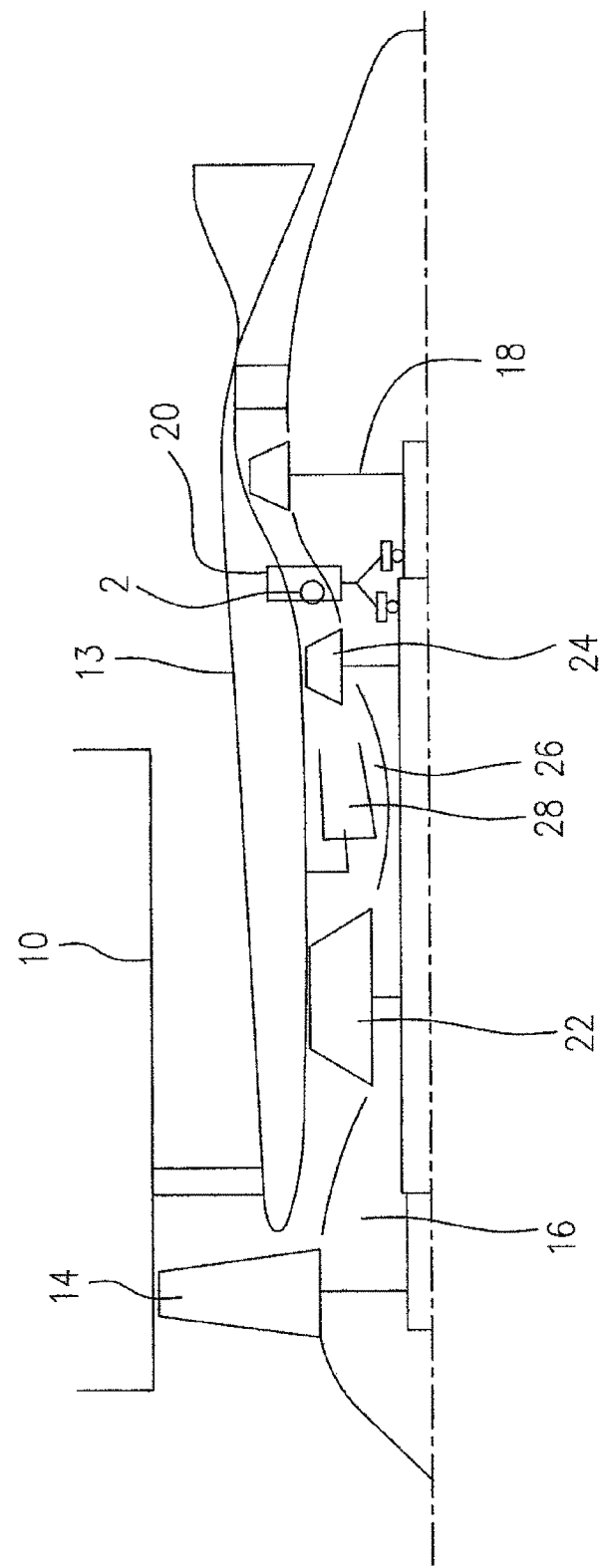
FIG. 1 is a schematic cross sectional view of a gas turbine engine according to the present description.
Figure 2:
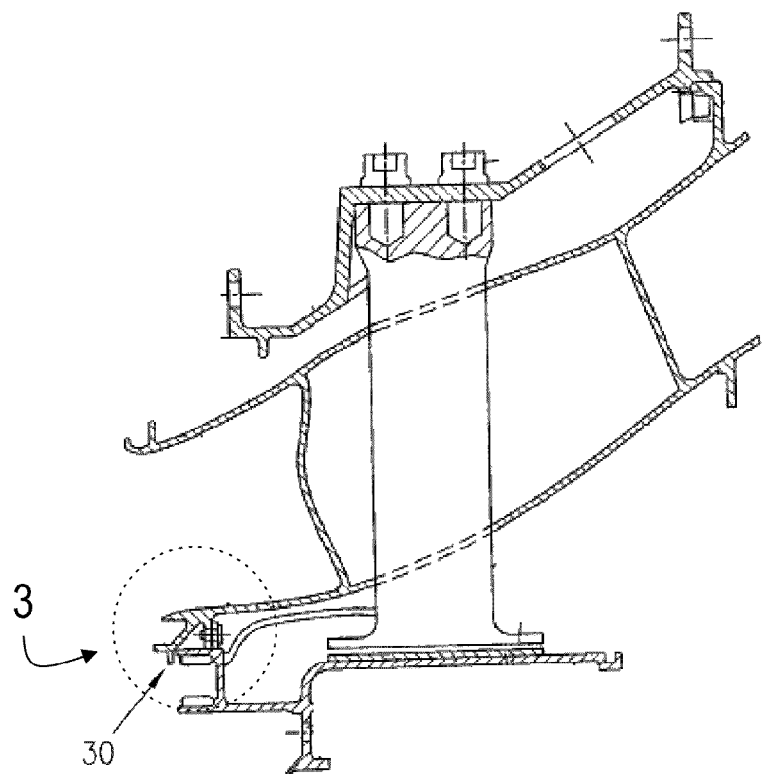
FIG. 2 is a cross-sectional view of a portion of the gas turbine engine of FIG. 1.

Referring to FIG. 1, a gas turbine engine presented as an example of the application of the described subject matter includes a housing or nacelle 10, a core casing 13, a low pressure spool assembly which includes a fan assembly 14, a low pressure compressor assembly 16 and a low pressure turbine assembly 18, and a high pressure spool assembly which includes a high pressure compressor assembly 22 and a high pressure turbine assembly 24. The core casing 13 surrounds the low and high pressure spool assemblies in order to define a main fluid path (not numbered) therethrough. In the main fluid path there is provided a combustor 28 to constitute a gas generator section 26. Generally, those downstream of the gas generator section 26 are hot sections and any engine structures in the hot sections such as a mid-turbine frame 20 which is located between the high pressure turbine assembly 24 and the low pressure turbine assembly 18. Referring to FIG. 2, a secondary air system (not indicated) delivers pressurized cooling air to the mid turbine frame 20 through a metering apparatus 30.

Figure 3:
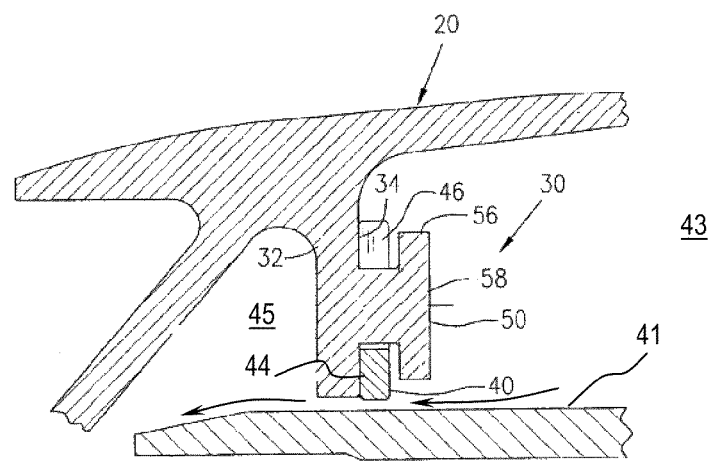
FIG. 3 is an enlarged view of a portion of FIG. 2.

Referring to FIG. 3, an example air metering apparatus 30 is depicted. The apparatus includes a first component such as a radial wall 32 as part of a stationary structure of the mid-turbine frame 20, such as a flange extending from a vane platform of the mid-turbine frame 20. The radial wall 32, for example, includes opposed radial surfaces 34 and 36, and extends to a radially-inward terminal periphery (not indicated). (Unless otherwise specified, the radial and axial directions are defined with respect to the engine axis shown in FIG. 1). The apparatus 30 further includes a second component having at least one radial surface or face 44, for example, a seal ring 40 having opposed radial surfaces 42, 44. The ring 40 may extend around/along the entire circumference of wall 32. A generally radially oriented slot 46 extends axially through the seal ring 40, that is, between the opposed radial surfaces 42, 44. The radially oriented slot 46 may define an opening (not indicated) in the outer periphery 48 of the seal ring 40. As will be described further below, when the seal ring 40 abuts the surface 34 of the radial wall 32, as shown in FIG. 3, sealing is provided such that air may pass only through a non-zero gap between the ring 40 and an engine case 41, provided in this example by another portion of the mid turbine frame 20, such as an inner bearing housing (not indicated). In a region of the ring 40, the engine case 41 extends generally cylindrically and axially along the engine axis past the radial wall 32 and ring 40. As mentioned, a radially-extending gap (not indicated) is defined between the ring 40 and the engine case 41, the gap size being selected to meter a desired secondary cooling flow therethrough.

Radial wall 32 and engine case 41 are respectively made from metals suitable for their particular applications, such as Nickel alloys or superalloys, such as MAR-M-247, IN713, and so on. It will be understood that such materials may have a thermal growth mismatch. Ring 40 may be made either from the same material as engine case 41, or from another material having the same or similar thermal coefficient of expansion, such that the engine case 41 and ring 40 will radially expand at a substantially the same rate when heated, as will be described further below. Material selection for main structural component, in this example radial wall 32 and engine case 41, is made to meet structural and durability requirements for the part. Material selection for the ring 40 is then done to match, as close as possible, the thermal radial displacement of engine case 41. It will be understood that the thermal displacement of ring 40 and engine case 41 will depend not only on the metal, but also on the metal temperature for each component, at specific engine running conditions (e.g.: cruise, take-off, etc). Thus, in a case where the same metal temperature exists for ring 40 and engine case 41 for a given engine running condition, the same material (or differing materials with substantially the same thermal expansion coefficients) may be selected, in order to provide a constant gap or spacing during engine running conditions. Alternately, where the same metals are used for wall 32 and engine case 41, yet thermal mismatch occurs due to the differing temperature each experience, the temperature and desired expansion of the ring 40 may be considered when selecting a metal for ring 40. Still alternately, respective materials having desired thermal expansion coefficients may be selected to one or increase or decrease the gap size during various engine running conditions, to thereby passively control secondary airflow requirements as desired.

A lug 50 with an enlarged head 56 extends from the radial wall 32. The lug 50 may have any suitable shape, and is received within the slot 46 of ring 40 to radially-slidably mount the ring to the wall. The enlarged head 56 retrains axial movement of the ring 40 away from the radial wall 32. The lugs and slots are preferably distributed substantially equally around the circumference of the engine, to facilitate maintaining a centering of the ring irrespective of any thermal growth experienced. The radial dimension of the slot 46 may be selected to allow for thermal radial expansion/contraction of the seal ring 40 independent from the connected radial wall 32.

In use, engine operation results in pressurized air delivered to cavity 43 adjacent air metering apparatus 30. The differential pressure between cavity 43 and a downstream cavity 45 of the secondary cooling system tends to press face 44 of ring 40 against radial wall 32, thereby sealing therebetween. The secondary cooling air in cavity 43 is thus encouraged to flow through the gap between ring 40 and engine case 41, to downstream cavity 45, as indicated by the arrows in FIG. 3. Ambient heat from engine operation tends to cause thermal growth, in the form of radial growth, of the engine components, and in particular the ring 40, the engine case 41 and the radial wall 32. The lug 50/slot 46 arrangement allows the ring to grow freely. The gap between the ring 40 and the engine case 41, however, remains substantially constant due to the selection of materials for ring 40 and engine case 41 described above. The gap size, and hence air flow through the gap, is thus substantially unaffected by any thermal growth of the structure at any engine running condition, which thus allows air consumption to be optimized and any variation in cooling flow minimized for different engine running conditions.

Figure 4:
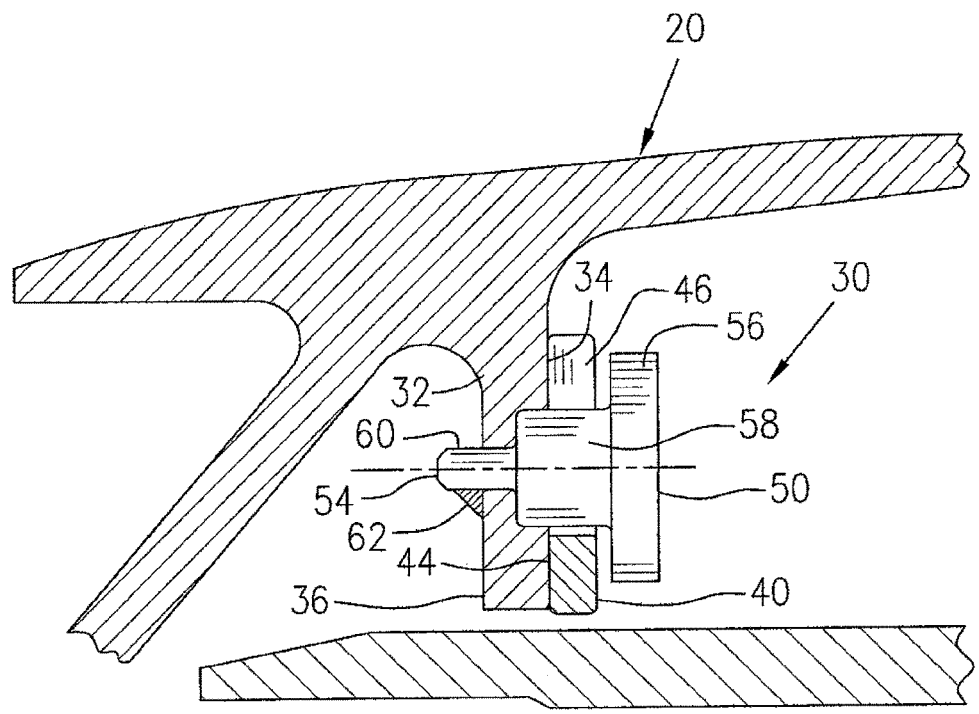
FIG. 4 is view similar to FIG. 3, of an alternate arrangement.
Figure 5:
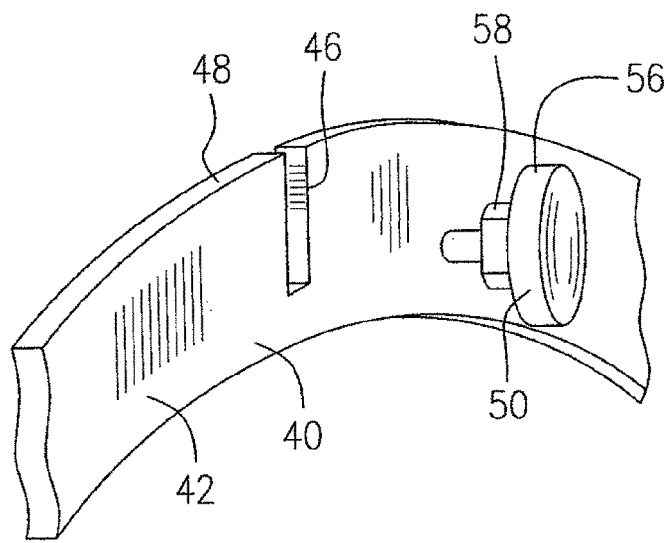
FIG. 5 is an isometric view of a portion of the device of FIG. 4.

Referring to FIGS. 4 and 5, in another example the lugs 50 are releasably mounted to the radial wall 32. In this example, the lug 50 is inserted into a hole 38 in the wall 32, and retained therein by a suitable fastener arrangements, such as a tack weld 62, or threaded fastener (not shown), press fit with locking wire (not shown) etc., or other suitable fastener arrangement. Optionally, the lug 50 has a cylindrical stem 58 axially extending from the enlarged head 56 and a cylindrical end portion 60 extending axially from the stem 58 to form the end 54. The end portion 60 may have a diameter less than the diameter of the stem 58. The removable fastener permits the lug 50 to be removed from the engine for replacement or repairing during engine maintenance. The tack weld 62 can be removed by grinding, or other suitable method.

The above description is meant to be exemplary only, and one skilled in the art will recognize that changes may be made to the embodiments described without departure from the scope of the described subject matter. For example, the ring may have any suitable configuration. The arrangement of the engine case and radial wall may be reversed, such that the airflow passage is defined around an outer radius of the ring, and so on. Still, other modifications will be apparent to those skilled in the art in light of a review of this disclosure, and such modifications are intended to fall within the scope of the appended claims.

The invention claimed is:

1. A gas turbine engine having an axis of rotation, the engine comprising:
    a radially-extending annular wall comprised of a metal having a first thermal expansion at an engine running temperature;
    a cylindrical surface extending axially past the wall, the surface and wall cooperating to define adjacent secondary airflow cavities, one secondary airflow cavity on either side of the wall, the airflow cavities in serial communication with a source of pressurized secondary air, the cylindrical surface comprised of a metal having a second thermal expansion at an engine running temperature, the second thermal expansion unequal to the first coefficient; and
    an annular ring radially-slidably mounted to the radial wall, the ring cooperating with the cylindrical surface to define a non-zero gap between them, the gap providing a minimum opening between the cavities and hence in use metering serial secondary airflow communication between the cavities, the ring having a face which in use sealingly cooperates with the wall to impede secondary airflow between the ring and wall, the ring comprised of a metal having a thermal expansion at an engine running temperature substantially equal to the second thermal expansion.

2. The gas turbine of claim 1, wherein the ring metal and the cylindrical surface metal have substantially equal coefficients of thermal expansion.

3. The gas turbine of claim 1, wherein the ring metal and the cylindrical surface metal are the same metal.

4. The gas turbine of claim 1, wherein the radial wall extends around an outside of the cylindrical surface.

5. The gas turbine of claim 1 wherein the ring further comprises a plurality of radially extending slots, the radial wall further comprises a plurality of axially extending lugs, and wherein the lugs engage the slots to radially-slidably mount the ring to the wall.

6. The gas turbine of claim 5 further comprising a fastener retaining each lug to the wall.

7. The gas turbine of claim 1 wherein the ring has radially-extending spaced apart faces which are parallel to one another.

8. A gas turbine engine having an axis of rotation, the engine comprising:
- a radially-extending annular wall having a terminal periphery, the radial wall comprised of a metal having a first coefficient of thermal expansion;
- a cylindrical surface extending axially past the terminal periphery of the wall, cylindrical surface comprised of a metal having a second coefficient of thermal expansion which is unequal to the first coefficient; and
- an annular ring extending around and radially-slidably mounted to the radial wall, the ring having a face sealingly cooperating with the wall to impede airflow therebetween when the engine is in use, the ring having a terminal periphery extending radially closer to the cylindrical surface than the terminal periphery of the wall, the terminal periphery of the ring spaced from the cylindrical surface to provide a non-zero gap between the ring and the cylindrical wall selected to meter a secondary airflow of the engine in communication with the gap, the ring comprised of a metal having a coefficient of thermal expansion substantially equal to the second coefficient of thermal expansion.

9. The gas turbine of claim 8, wherein the radial wall extends around an outside of the cylindrical surface.

10. The gas turbine of claim 8, wherein the ring further comprises a plurality of radially extending slots, the radial wall further comprises a plurality of axially extending lugs, and wherein the lugs engage the slots to radially-slidably mount the ring to the wall.

11. The gas turbine of claim 10, further comprising a fastener retaining each lug to the wall.

12. The gas turbine of claim 8, wherein the ring has radially-extending spaced apart faces which are parallel to one another.

13. The gas turbine of claim 8, wherein the ring and the cylindrical wall are comprised of the same material.

* * * * *